United States Patent [19]

Mahle et al.

[11] 4,065,005
[45] Dec. 27, 1977

[54] DEVICE FOR LOADING RAILROAD CARS FROM A GRAIN STORAGE COMPLEX

[75] Inventors: Howard C. Mahle, Minnetonka, Minn.; Harris B. Thomas, Ames, Iowa

[73] Assignees: Todd & Sargent, Inc., Ames, Iowa; Nott Company, Minneapolis, Minn.; part interest to each

[21] Appl. No.: 739,572

[22] Filed: Nov. 8, 1976

[51] Int. Cl.² ............................................ B65G 67/06
[52] U.S. Cl. .................................. 214/41 R; 193/3; 193/30; 141/387
[58] Field of Search ............. 214/41 R, 14, 16 R; 193/3, 30; 141/231, 232, 387, 388

[56] References Cited

U.S. PATENT DOCUMENTS

| | | | |
|---|---|---|---|
| 840,863 | 1/1907 | Patterson | 193/3 |
| 1,918,133 | 7/1933 | Rennels | 193/30 |
| 2,657,782 | 11/1953 | Gerber | 193/3 |
| 3,924,666 | 12/1975 | Raison | 141/231 |
| 3,944,090 | 3/1976 | Flood | 214/41 R X |

*Primary Examiner*—Albert J. Makay
*Attorney, Agent, or Firm*—Zarley, McKee, Thomte, Voorhees & Sease

[57] ABSTRACT

A device for unloading grain from a grain storage complex to railroad cars positioned on a railroad siding extending thereby. An overhead track structure is positioned above the railroad car and has a crane longitudinally and laterally movably mounted thereon. A vertically movable loading spout is secured to the crane and extends downwardly therefrom for delivering grain to the hatch openings of the railroad cars. The upper end of the vertically movable tube is universally connected to the lower end of a telescopic delivery tube which has its upper end universally connected to a spout extending from the grain storage facility. The operator may move the crane longitudinally and laterally with respect to the railroad car so that the grain may be loaded into various parts of the car without moving the same.

2 Claims, 4 Drawing Figures

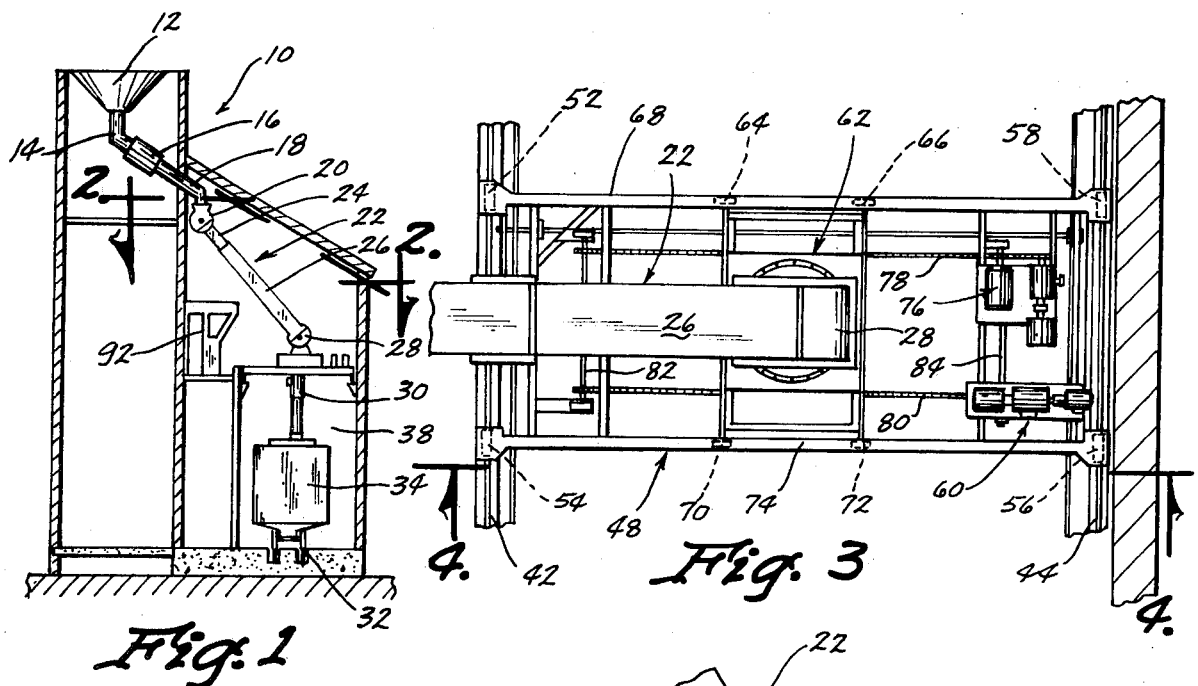
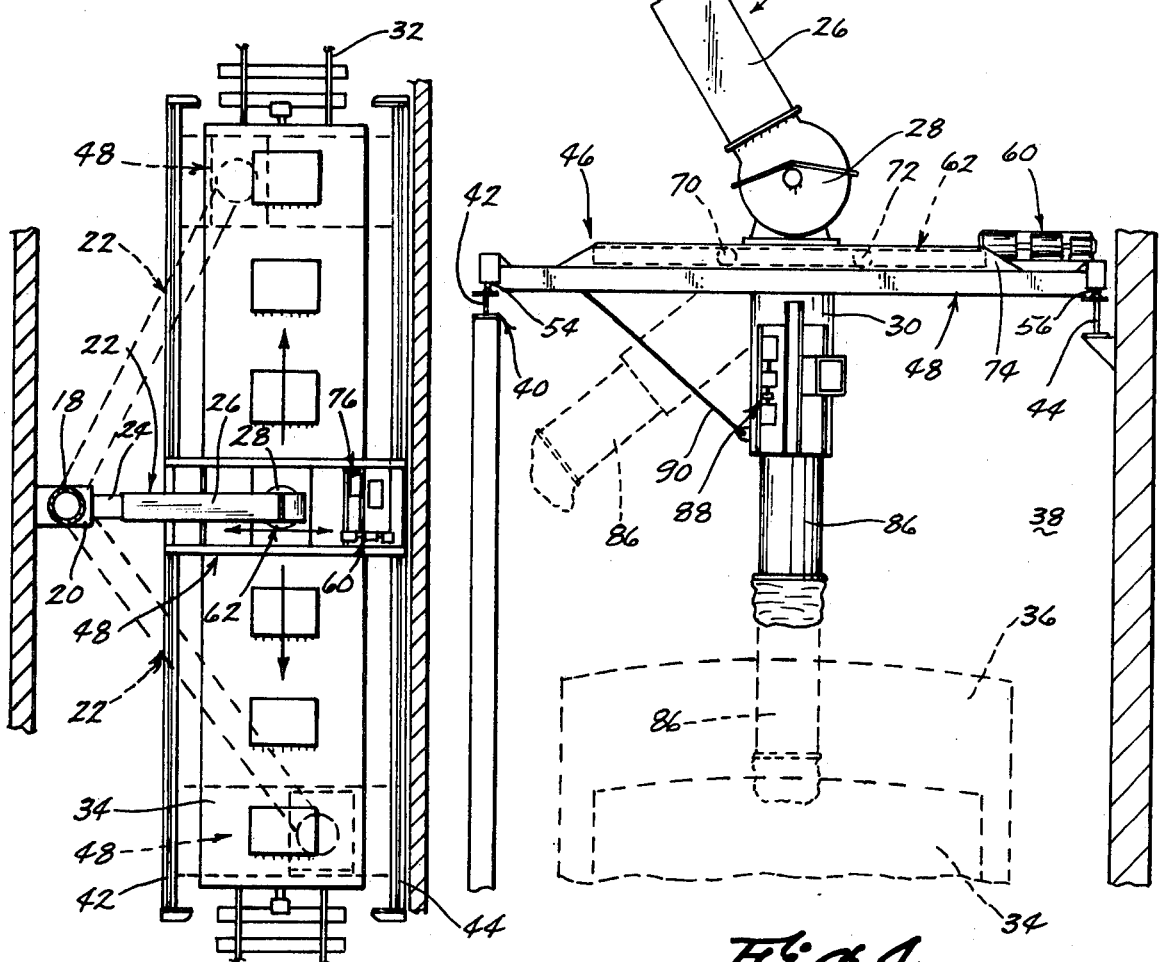

DEVICE FOR LOADING RAILROAD CARS FROM A GRAIN STORAGE COMPLEX

BACKGROUND OF THE INENTION

Railroad or hopper cars are frequently filled with grain contained in a grain storage complex by means of a movable downspout assembly extending from the storage facility. In years past, the loading spout was manually moved with respect to the proper car. In other facilities, the downspout remains stationary and it was necessary for the car to be moved or spotted with respect to the downspout. Additional attempts have been made to provide means for mechanically moving the downspout relative to the railroad car but such attempts have met with little success.

Therefore, it is a principal object of the invention to provide an improved device for loading railroad cars from a grain storage complex.

A still further object of the invention is to provide a device for loading railroad cars wherein means is provided for longitudinally and laterally moving the grain discharge spout relative to the car.

A still further object of the invention is to provide a device for loading railroad cars from a grain storage complex including a vertically movable loading spout portion for accommodating various car sizes.

A still further object of the invention is to provide a device for loading railroad cars from a grain storage complex wherein the loading spout may be moved laterally and longitudinally with respect to the railroad car without the necessity of moving or spotting the car.

A still further object of the invention is to provide a device for loading railroad cars from a grain storage complex which may be easily and conveniently remotely controlled.

These and other objects will be apparent to those skilled in the art.

BRIEF DESCRIPTION OF THE DRAWINGS

FIG. 1 is a side view illustrating a grain storage complex having the device of this invention associated therewith:

FIG. 2 is an enlarged sectional view seen on lines 2—2 of FIG. 1:

FIG. 3 is a partial top view of the device of this invention; and

FIG. 4 is a sectional view seen on lines 4—4 of FIG. 3.

SUMMARY OF THE INVENTION

The device of this invention comprises a telescopic delivery tube which has its upper end universally connected to a spout extending from a grain storage facility. The lower end of the telescopic delivery tube is universally connected to a vertically movable loading spout which is adapted to deliver the grain to the interior of the railroad car positioned on the siding adjacent the grain complex facility. An overhead track structure is positioned above the railroad siding and has a traveling crane apparatus mounted thereon. The vertically movable loading spout is operatively connected to the crane for movement therewith. Means is provided for moving the crane apparatus longitudinally and laterally with respect to the track structure and the railroad car.

DESCRIPTION OF THE PREFERRED EMBODIMENT

The numeral 10 refers to a grain storage facility including a grain storage tank 12. Spout 14 extends downwardly from tank 12 to sampler assembly 16 which has a spout 18 extending downwardly and outwardly therefrom. A swivel housing connection 20 universally connects spout 18 with a telescopic delivery spout 22 comprised of spout portions 24 and 26. The lower end of spout portion 26 is provided with a swivel housing connection 28 which has a spout 30 secured thereto and extending downwardly therefrom.

The numeral 32 designates a railroad siding extending by the storage facility 10 adapted to have grain or hopper cars 34 positioned thereon. In FIG. 4, the jumbo type of hopper car is referred to by the reference numeral 36. Facility 10 includes an area 38 into which the cars move and are spotted on the siding. An overhead track structure 40 is positioned above the siding 32 and is comprised of longitudinally extending tracks 42 and 44 suitably supported.

A crane means 46 is longitudinally and laterally movably mounted on tracks 42 and 44. Crane means 46 generally comprises a crane structure 48 having rollers or wheels 52 and 54 positioned on track 42 and rollers or wheels 56 and 58 positioned on track 44. The numeral 60 refers generally to a reversible gear motor assembly mounted on crane structure 48 which is provided for propelling the crane structure 48 longitudinally along tracks 42 and 44.

Crane structure 62 is laterally movably mounted on crane structure 48 as illustrated in the drawings. As seen, crane structure 62 has a pair of wheels or rollers 64 and 66 positioned within frame member or rail 68 on crane structure 48 and has a pair of wheels or rollers 70 and 72 positioned within frame member or rail 74 on crane structure 48.

The numeral 76 refers generally to a reversible gear motor assembly operatively connected to chain assemblies 78 and 80 extending between shafts 82 and 84 which are rotatably mounted on crane structure 48. Crane structure 62 is operatively connected to the chain assemblies 78 and 80 so that movement of the chain assemblies 78 and 80 by the gear motor assembly 76 will cause crane structure 62 to move laterally with respect to crane structure 48. As seen in the drawings, spout 30 is operatively secured to crane structure 62 so that lateral or longitudinal movement of crane structure 62 will cause spout 30 to be likewise moved.

Spout 86 is vertically telescopicly received by spout 30 by any convenient means. In this example, a winch-motor assembly 88 is mounted on spout 30 and is operatively connected to spout 86 for selectively vertically raising and lowering spout 86 with respect to spout 30. Cable 90 is connected to tube 30 at the lower end thereof and is connected to a gear motor or the like for pivotally moving the spouts 30 and 86 to the position illustrated by broken lines in FIG. 4.

The entire loading operation and specific operation of gear motors 60 and 76, winch-motor assembly 80 and movement of cable 90 is controlled from the operator's station 92. When it is desired to load the car 34, it is not necessary for the car 34 to be precisely spotted with respect to the storage facility. Ordinarily, the spouts 30 and 86 would be pivoted to the position illustrated by broken lines in FIG. 4 as the car is being moved beneath the overhead track structure. When the car is in position, the operator in the operator's station 92 causes spouts 30 and 86 to be located in the vertically disposed position illustrated in FIG. 4. The operator then actuates gear motor assemblies 60 and 76 to cause the crane structure to move longitudinally and laterally with respect to the overhead track structure so that spout 86 is positioned at the desired location with respect to the car. The swivel connections 20 and 28 permit the delivery spout 22 to pivot with respect to the spout 18. The telescopic relationship between spout portions 24 and 26 permits the length of the delivery spout 22 to automatically lengthen or shorten depending upon the location of the crane structure on the track. The operator may also control the operation of the winch-motor assembly 88 from the operator station to cause the spout 86 to be lowered downwardly into one of the hatch openings of the car as desired.

Thus it can be seen that a novel device has been provided for loading railroad cars from a grain storage complex which completely eliminates the need for manual positioning of the loading spout or the constant and precise spotting of the car. It can also be seen that a convenient means has been provided for longitudinally and laterally adjusting the loading spout with respect to the railroad car so that the car will be properly and conveniently loaded with a minimum of effort. It can therefore be seen that the device accomplishes at least all of its stated objectives.

We claim:

1. In combination with a grain storage facility having a railroad siding adapted to receive grain carrying hopper cars, the invention comprising, an overhead track structure positioned over said railroad siding and above any hopper cars thereon, crane means mounted on said overhead track structure, said crane means comprising a first crane member longitudinally movably mounted on said overhead track structure and a second crane member laterally movably mounted on said first crane member, a telescopic delivery tube having its lower end universally connected to said second crane member and having its upper end universally connected to said grain storage facility and being adapted to receive grain from said grain storage facility, power means to move said telescopic delivery tube and said crane members longitudinally and laterally with respect to said track structure, a normally vertically disposed telescopic tube extending downwardly from said crane means and being in communication with said telescopic delivery tube to deliver grain to hopper cars on said railroad siding, and said vertically disposed telescopic tube being operatively pivotally connected to said telescopic delivery tube and means for moving said telescopic tube from a vertically disposed grain delivery position to an inclined stored position.

2. The combination of claim 1 wherein power means is connected to said vertically disposed telescopic tube for moving said tube between said positions.

* * * * *